United States Patent [19]

Heine

[11] Patent Number: 4,665,765
[45] Date of Patent: May 19, 1987

[54] ANTI-FRICTION WORM GEAR SPEED REDUCER AND NEEDLE SCREW

[76] Inventor: Otto R. Heine, 13372 Calle Colina, Poway, Calif. 92064

[21] Appl. No.: 728,878

[22] Filed: Apr. 30, 1985

[51] Int. Cl.⁴ .......................... F16H 1/16; F16H 1/08
[52] U.S. Cl. ............................... 74/458; 74/424.8 R; 74/425
[58] Field of Search .................. 74/458, 425, 462, 464, 74/465, 424.8 R, 424.8 NA, 459, 89.14, 89.15

[56] References Cited

U.S. PATENT DOCUMENTS

| 657,349 | 9/1900 | Jones . | |
|---|---|---|---|
| 731,527 | 6/1903 | Wagner | 74/458 |
| 1,164,847 | 12/1915 | Neubauer | 74/464 |
| 1,307,462 | 6/1919 | Steffensen | 74/464 |
| 1,347,802 | 7/1920 | Botts | 74/458 |
| 1,885,970 | 11/1932 | Westling . | |
| 3,081,639 | 3/1963 | Hauptmann | 74/25 |
| 3,377,879 | 4/1968 | Shiwaku | 74/425 |
| 3,494,215 | 2/1970 | Fengler | 74/409 |
| 3,581,592 | 6/1971 | Roehrs | 74/464 |

FOREIGN PATENT DOCUMENTS

| 9285 | 3/1898 | Austria | 74/465 |
|---|---|---|---|
| 18914 | of 1904 | United Kingdom | 74/465 |
| 427189 | 10/1974 | U.S.S.R. . | |

Primary Examiner—Allan D. Hermann
Attorney, Agent, or Firm—Klein & Szekeres

[57] ABSTRACT

An anti-friction worm-worm gear type speed reducer torque converter is disclosed. The speed reducer has a rotatably mounted worm gear adapted to mesh with a rotatably mounted worm incorporating a plurality of circulating rolling elements. In one embodiment, the configuration of the spiral thread of the worm is such that the balls incorporated in the load carrying side face of the spiral thread provide a substantially continuous substantially spiral shaped contact line with the load transmitting tooth of the worm gear. This is accomplished by providing the helicoid spiral thread of the worm with a flat, approximately bell shaped profile in the radial direction, with reference to the longitudinal axis of the worm, and by gradually modifying the trapezoidal dimensions of the spiral thread in axial cross-section. In another embodiment, the helicoid spiral thread of a worm is substantially uniform throughout the entire threaded portion of the worm, and tapered needles are retained in channels machined in the side faces of the spiral gear. The worm having circulating tapered needles can also engage a conventional trapezoid threaded nut to provide a "needle screw" useful in such applications where conventional ball screws are used.

18 Claims, 14 Drawing Figures

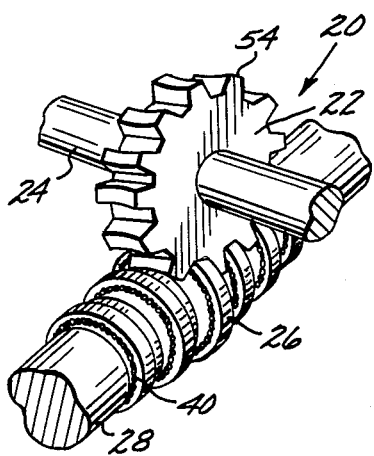
FIG.1
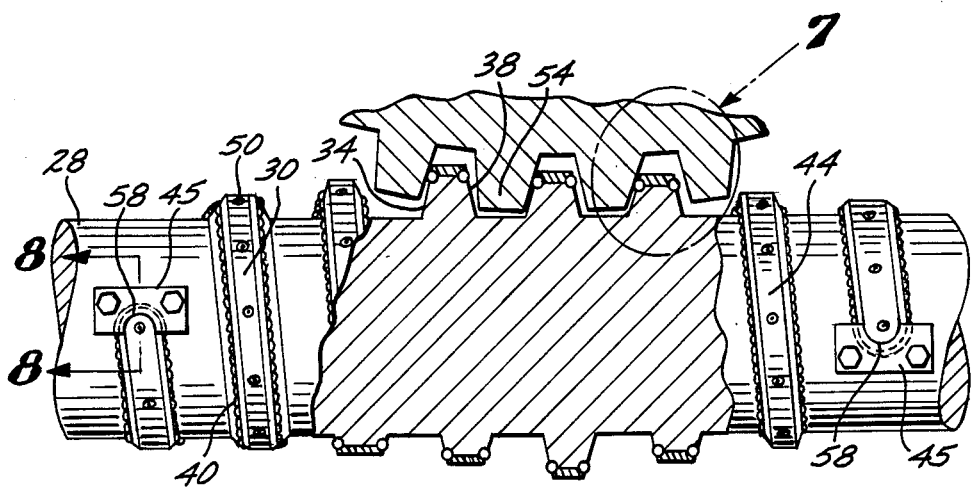
FIG.2
FIG.4
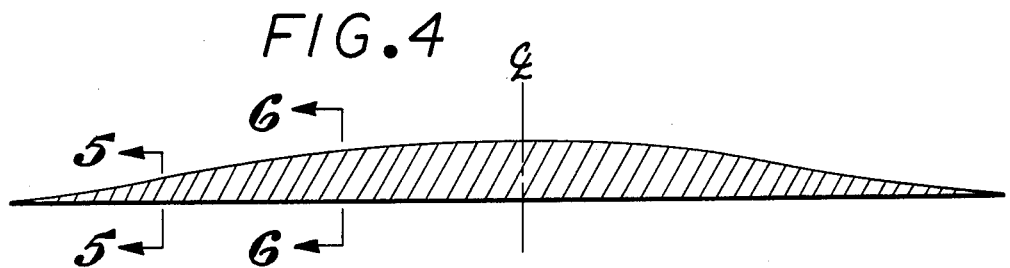
FIG.5
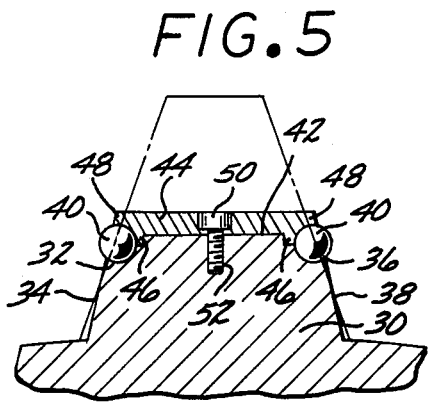
FIG.6
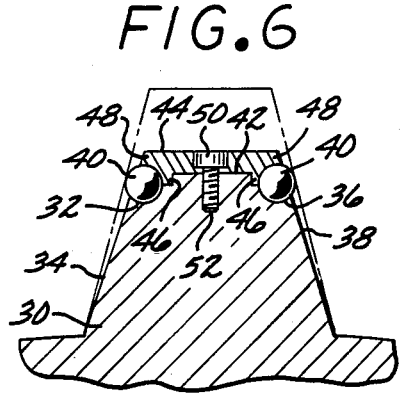

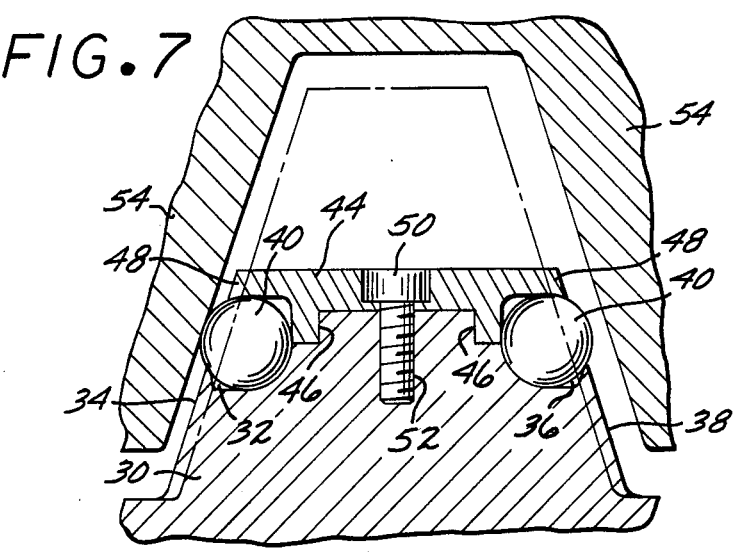
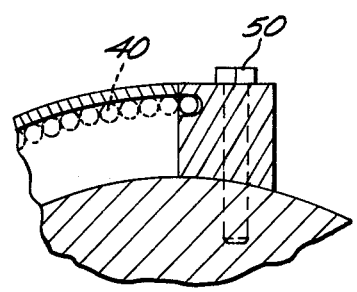
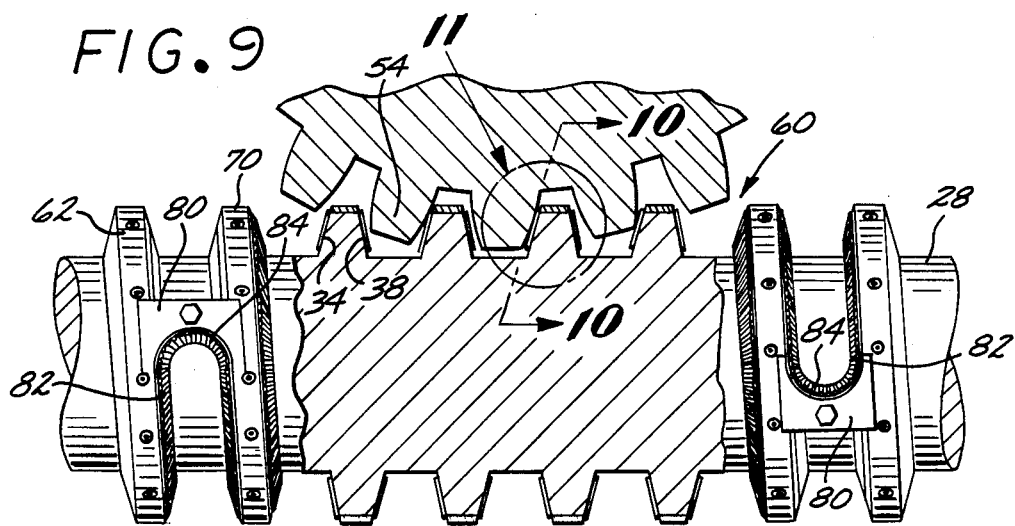
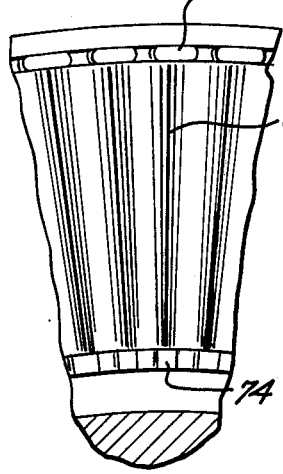
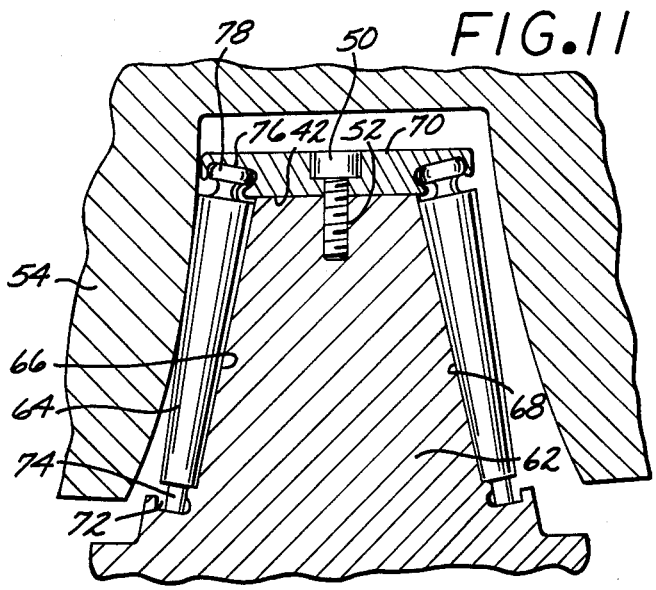

ANTI-FRICTION WORM GEAR SPEED REDUCER AND NEEDLE SCREW

BACKGROUND OF THE INVENTION

1. Field of the Invention

The present invention is directed to improvements in worm - worm gear type speed reducers. More particularly, the present invention is directed to an improved worm and worm gear assembly wherein a plurality of rolling elements are mounted in the spiral teeth of the worm to provide a substantially continuous line contact between the mating teeth of the worm gear and the worm, resulting in relatively low friction and improved power transmission effectiveness.

2. Brief Description of the Prior Art

Speed reducers or torque converters having a worm engaging a worm gear are well known in the mechanical arts. As is well known, in these devices the respective axes of rotations of the worm gear and of the worm are non-intersecting and usually perpendicular to one another. Moreover, these devices are often used in heavy machinery where the transmitted power is large, and relatively large (approximately 100:1 to 20:1) speed reduction (from the input shaft of the worm to the output shaft of the worm gear) is required.

Worm - worm gear speed reducers, however, function with relatively large sliding friction between the mating teeth, so that their power transmission efficiency is low, in the range of fifty to ninety per cent (50% to 90%), usually in the lower region of the above-noted range.

Mechanical rating of these devices is defined as the power which may be transmitted through the device without excessive wear, or tooth failure, provided the device is kept reasonably cool. Thermal rating, on the other hand, is defined as the maximum power the device can transmit without overheating. Because of the relatively large friction of the worm - worm gear speed reducers, their thermal, rather than mechanical rating is usually the limiting factor in their use where large powers are transmitted and the speed reduction is large.

For the above-summarized reasons, worm - worm gear assemblies in continuous use in heavy machinery, often need to be cooled by various types of heat exchange devices, such as oil pumps, oil jets or the like. Still, the power transmission efficiency or worm - worm gear speed reducers is often less than what is desired. Moreover, because the devices have to accomodate relatively high thermal expansion of the worm, which has the high sliding velocity during operation, the differential expansion has to be accomodated in the design of the device. Overall, it is very difficult to construct worm - worm gear power transmission assemblies for high loads which operate without appreciable backlash.

The prior art has, by-and-large, recognized the above-noted serious limitations of worm - worm gear speed reducers. In order to overcome these limitations, the prior art has provided devices wherein balls are placed into the spiral thread of the worm so as to replace sliding friction with rolling friction. More particularly, U.S. Pat. No. 657,349 describes a worm having a continuous groove along the usual pitch line in its driving surface. The groove contains balls, which are said to provide "rolling" rather than "rubbing" friction with the meshing gear. The balls circulate through a reverse channel which is provided in the worm.

U.S. Pat. No. 1,347,802 describes a worm similar to the worm of U.S. Pat. No. 657,349. Balls are placed into a channel cut into one side of the spiral thread of the worm. The balls circulate through a pair of longitudinally curved tubes which are mounted to the ends of the spiral thread of the worm.

U.S. Pat. No. 3,377,879 describes still another worm having a plurality of circulating balls. The balls are placed into a helically shaped thread provided in the vicinity of the pitch line on one side of the thread, and are held therein by a ball retainer secured on the surface of the thread. Circulation of the balls is accomplished through curved guide tubes which are provided at the end of the worm.

U.S.S.R Pat. No. 427189 describes a ball worm drive where the thread of the worm is cut up by channels into individual teeth around which rows of balls circulate inside conical inserts.

Still additional disclosures relating to ball containing worms or like devices may be found in U.S. Pat. Nos. 3,494,215 and 1,885,970.

The above-noted "improved" worm - worm gear assemblies, however, also suffer from a serious disadvantage, in that placement of the balls along the pitch line of the worm fails to provide continuous, or substantially continuous line contact between the balls and the worm gear teeth which mesh with the worm.

More particularly, the theoretical facial contact between a cylindrical, helical drive worm and a mating worm gear is along a line covering the width of the worm gear tooth. This line propagates, as the worm gear rotates, from the tip of the tooth to the root of the tooth. Actually, because of virtually unavoidable machining errors, in real machine construction only approximately fifty per cent (50%) of the available worm gear tooth width is in contact, at any given time, with the spiral tooth of the drive worm.

The curvature of the contact line between the worm gear tooth and the worm thread changes continuously as the worm and worm gears rotate. This continuously changing contact line is geometrically complex, and at no time matches the circular pitch line of the worm.

For the above stated reasons, with the possible exception of the above-noted U.S.S.R. Pat. No. 427189, the ball containing worms of the prior art can have, at any given time, no more than two balls in contact with the revolving worm gear. This is because in the prior art the rows of balls in the worm are aligned either with the circular pitch line of the spiral thread of the worm, or with a likewise circular line disposed parallel with the pitch line. Thus, contact between the balls and the mating tooth of the worm gear occurs only where the "complex" theoretical contact line crosses the circular pitch line. At this "cross-over" point there can be only one, at most two balls, which are capable of transferring power from the worm to the worm gear.

Because in heavy machinery the contact pressure between the worm and worm gear is several thousand PSI, in prolonged or heavy use two balls are ill equipped to carry this load.

Stated in other words, the ball containing worm - worm gear assemblies of the prior art, which have the circulating balls disposed along the theoretical circular pitch line of the spiral thread of the worm (or along a line parallel with the circular pitch line), are, generally speaking, incapable of accomplishing their desired objective. Because of very high loads on the balls of these devices, rapid structural failure of the balls is likely, and the devices are therefore incapable of reliable use in heavy machinery. In fact, the inventor of the present invention is unaware of any commercially available ball containing worm - worm gear assembly.

The present invention overcomes the above-noted problems. The worm - worm gear assemblies of the present invention can operate with truly reduced friction under high load conditions for prolonged periods of time.

SUMMARY OF THE INVENTION

It is an object of the present invention to provide a worm - worm gear assembly which operates with greatly reduced friction and increased mechanical efficiency.

It is another object of the present invention to provide a worm - worm gear assembly wherein sliding friction of meshing parts is replaced with essentially rolling friction of a plurality of rolling elements, and which are capable of transmitting large loads under prolonged operating conditions.

The foregoing and other objects and advantages are attained by an assembly including a rotatably mounted worm having a continuous spiral thread and a rotatably mounted worm gear having substantially conventional teeth for engagement with the worm. A plurality of rolling elements, balls or tapered needles, are mounted into a channel or slot provided on both sides of the spiral thread in a configuration which permits, as the gears rotate, a substantially continuous contact line to be attained between the rolling elements and the engaging teeth of the worm gear. The rolling elements circulate by moving, in a rolling motion, on both the load carrying and non-load carrying side of the worm's spiral thread.

In one embodiment of the device of the invention, the spiral thread of the worm is of gradually changing magnitude in the radial direction, with reference to the longitudinal axis of the worm, so that the ball containing slot or channel does not coincide with the circular pitch line of a theoretical helicoid thread.

In another embodiment of the device of the invention, the spiral thread of the worm has the slot on both of its side faces, and a plurality of tapered needles are mounted into the slot. The embodiment of the worm, which has the plurality of tapered needles in the above-summarized configuration, is also advantageously used in a novel needle screw constructed in accordance with the present invention.

The features of the present invention can be best understood, together with further objects and advantages by reference to the following description, taken in connection with the accompanying drawings, wherein like numerals indicate like parts.

BRIEF DESCRIPTION OF THE DRAWINGS

FIG. 1 is a schematic, perspective view of the first preferred embodiment of the worm - worm gear assembly of the present invention;

FIG. 2 is a cross-sectional view of the first preferred embodiment;

FIG. 4 is a schematic view showing the profile of the spiral thread of the first preferred embodiment;

FIG. 5 is a schematic view showing the cross-sectional profile of the spiral thread of the first preferred embodiment relative to the profile of a conventional trapezoid spiral thread, at a location with reference to the longitudinal axis of the worm, which is indicated by lines 5, 5 on FIG. 4;

FIG. 6 is another schematic view showing the cross-sectional profile of the spiral thread of the first preferred embodiment relative to the profile of a conventional trapezoid spiral thread, at a location with reference to the longitudinal axis of the worm, which is indicated by the lines 6, 6 on Figure 4;

FIG. 7 is an enlarged view of the area indicated by the numeral 7 in FIG. 2;

FIG. 8 is a cross-sectional view taken on lines 8, 8 of FIG. 2;

FIG. 9 is a cross-sectional view of a second preferred embodiment of the worm - worm gear assembly of the present invention;

FIG. 10 is a cross-sectional view taken on lines 10, 10 of FIG. 9, and

FIG. 11 is an enlarged view of the area indicated by the numeral 11 in FIG. 9;

DESCRIPTION OF THE PREFERRED EMBODIMENT

Figure 3:
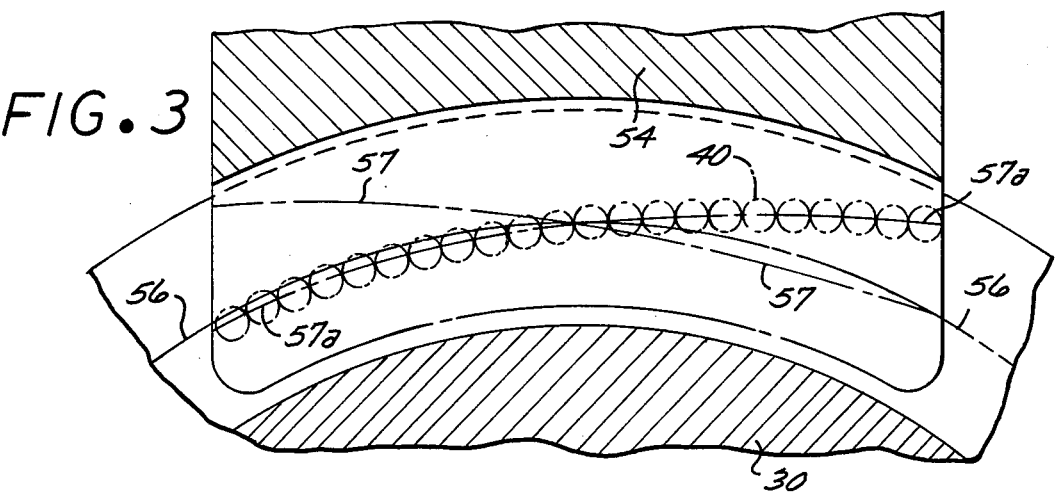
FIG. 3 is another cross-sectional view taken on lines 3, 3 of FIG. 2.

The following specification taken in conjunction with the drawing sets forth the preferred embodiment of the present invention. The embodiments of the invention disclosed herein are the best mode contemplated by the invention for carrying out his invention in a commercial environment, although it should be understood that various modifications can be accomplished within the scope of the present invention.

Referring now to FIGS. 1 through 8 of the appended drawings, and particularly to FIGS. 1 and 2, a first preferred embodiment 20 of the worm - worm gear assembly of the present invention is disclosed. The worm - worm gear assembly of the present invention includes a substantially conventional worm gear 22, which is mounted on a worm gear axle, or first axle 24, to operatively interface with a worm 26. The worm 26 is mounted on a worm axle, or second axle 28. The worm - worm gear assembly of the present invention is primarily useful in heavy machinery where large torques need to be transmitted, or in machinery wherein low friction of the gearing is desired, such as in steering mechanisms, or in other applications where high efficiency or a worm - worm gear power transmission is desired. Conventional features of worm - worm gear type power transmissions are described in the present description only to the extent necessary to illustrate the present invention.

As is known in the art, power transmission in worm - worm gear type mechanisms usually occurs from the worm 26 to the worm gear 22. The worm gear 22 rotates much slower, usually twenty to one hundred times slower, than the worm 26. The two gears 22 and 26 are mounted to rotate on non-intersecting but usually perpendicular axes. This is shown in FIG. 1 of the appended drawings.

Referring now principally to the novel features of the first preferred embodiment 20 of the present invention, the worm 26 includes a spiral thread 30, which although helicoid, greatly differs from the conventional helicoid spiral thread configuration used in worms of the prior art. The spiral thread 30 of the worm 26 of the present invention contains an upwardly open continuous channel or slot 32 in its load carrying side face 34, and another channel or slot 36 in its non-load carrying side face 38. The channels 32 and 36 have substantially spheric or eliptical, concave curvature to accept a plurality of balls 40.

An upper, substantially linear face 42 of the spiral thread 30 receives a spiral shaped ball retainer member 44 which interfaces with a shoulder 46 formed in the upper face 42 of the spiral thread 30. The ball retainer member 44 has two projections 48 laterally extending to each side of the spiral thread 30 to retain the balls 40 in the respective channels 32 and 36. The ball retainer member 44 may be comprised of several sections (not shown) which are fastened to the worm 26. In the herein described preferred embodiment the ball retainer 44 is attached to the spiral thread 30 with threaded fasteners 50 received in threaded apertures 52 disposed in the upper face 42 of the spiral thread 30. The ball retainer 44 is preferably made of hardened steel, or like high strength tool steel material.

The configuration of the spiral thread 30 is selected in such a manner that the balls 40 captured in the channel 32 on the load carrying side 34 provide a substantially continuous contact with the mating tooth 54 of the worm gear 22 which is momentarily in the contact area with the worm 26. In other words, the geometric configuration of the spiral thread 30 is selected to permit more than two balls 40 to be simultaneously in contact with the worm gear tooth 54 which is in the "zone of action". To this end, the spiral thread 30 has a gradually increasing and thereafter gradually decreasing magnitude in the radial direction, with reference to the longitudinal axis of the worm 26. The cross-sectional profile of the spiral thread 30, in the radial direction) along the longitudinal axis of the worm 26 is illustrated on FIG. 4, as a rather flat, approximately bell shaped curve. This profile of the spiral thread 30 of the first preferred embodiment 20, is also well illustrated on FIGS. 1, 2, 5, and 6.

In addition to the gradually changing profile of the spiral thread 30 in the radial direction, the spiral thread 30 employed in the first preferred embodiment 20 of the worm - worm gear assembly of the present invention also deviates in the "axial" direction from the conventional trapezoid profile of spiral threads of like devices of the prior art. More particularly, in prior art worms the spiral thread has a uniform trapezoid profile. Such theoretical "prior art" trapezoid profile is indicated on FIGS. 5 and 6 with phantom lines. In the present invention, in the end regions of the flat approximately bell shaped curve, the spiral thread 30 is slightly wider in the axial cross-section than the theoretical trapezoid profile of a comparable conventional spiral thread. Conversely, in the mid-region of the approximately bell shaped curve, the spiral thread 30 is slightly narrower than the theoretical trapezoid profile of a comparable conventional spiral thread.

Referring still principally to FIGS. 4, 5 and 6 and explaining in different words the configuration of the spiral thread 30 employed in the first preferred embodiment 20 of the present invention, proceeding along the axis of the worm 26 the spiral thread 30 gradually increases radially and gradually decreases in width until the longitudinal middle of the threaded portion of the worm 26 is reached. In the middle of the worm 26, the spiral thread 30 reaches its highest point radially, and its narrowest point in axial cross-section. Proceeding from the middle of the worm 26 towards the end of the worm 30, the spiral thread 30 gradually decreases radially, and increases gradually in axial cross-section. The ball containing channel 32 disposed on the load carrying face 34 of the spiral thread 30, however, is formed, preferably by machining, into the top of the spiral thread 30, so that the balls 40 are aligned in a curve which does not coincide with the theoretical pitch center line of comparable conventional helicoid spiral threads (not shown).

A very important consequence of the above-described configuration is that the balls 40 are aligned in the channel 32 along a line where the contact with the teeth 54 of the worm gear 22 occurs. FIG. 3 schematically illustrates the theoretical pitch center line 56 of a comparable conventional helicoid spiral thread, the theoretical contact line 57 of a conventional worm - worm gear assembly, and also the alignment of the balls 40 in the ball retaining channel 32 in accordance with the present invention. Because in the present invention the balls 40 are aligned with a modified substantially spiral shaped contact line 57a, which is substantially different than the conventional theoretical contact line 57, more than two balls 40 can simultaneously contact the load transmitting tooth 54 of the worm gear 22. This is in sharp contrast with the prior art. As a direct consequence of the above-described configuration of the spiral thread 30, in the present invention the balls 40 provide a substantially continuous contact line 57a with the load carrying teeth 54 of the worm gear 22, so that substantial torque can be transmitted through the worm - worm gear assembly without significant danger of overloading the balls 40.

Referring now principally to FIGS. 2, 7 and 8, the method of circulating the balls 40 in the first preferred embodiment 20 is disclosed. As the worm gear teeth 54 engage the balls 40, the balls 40 roll in the channel 32 on the load carrying side face 34 of the spiral thread 30 until they reach the end 58 of the spiral thread 30. The channel 32 of the load carrying side face 34 interconnects with the channel 36 on the non-load carrying side face 38. Thus, at the end 58 of the spiral thread 30, the balls 40 are directed from the channel 32 by the retainer member 44 and by additional auxiliary blocks 45 into the channel 36 of the non-load carrying side 38. At the other end 58 of the spiral thread 30, the balls 40 move from the channel 36 of the non-load carrying side 38 to the channel 32 of the load carrying side 34.

Referring now specifically to the enlarged view of FIG. 7, the balls 40 which move on the non-load carrying side 38 of the spiral thread 30 are shown to clear the teeth 54 of the worm gear 22. This is necessary to prevent interference with the circulation of the balls 40.

Referring now to FIGS. 9, 10 and 11 of the appended drawings, a second preferred embodiment 60 of the worm - worm gear assembly of the present invention is disclosed. In the second preferred embodiment 60, a spiral thread 62 of the worm 26 is substantially helicoid, and has a substantially uniform profile throughout the length of the threaded portion of the worm 26.

In order to accomplish the objective of providing a substantially continuous contact line with the load transmitting teeth 54 of the worm gear 22, the spiral thread 62 of the second preferred embodiment 60 is adapted to receive a plurality of tapered rollers or needles 64. To this end, an upwardly open slot 66 is provided in the load carrying side 34, and another upwardly open slot 68 is provided in the non-load carrying side 38 of the spiral thread 62. In the axial cross-section of the spiral thread 62, the slots 66 and 68 are bounded by a substantially straight line, as is particularly shown on FIG. 11.

A retainer member 70 is affixed to the upper face 42 of the spiral thread 62. As in the hereinbefore described first preferred embodiment 20, the retainer 70 may be comprised of sections (not shown), which are attached to the spiral thread 62 by threaded fasteners 50 received in threaded apertures 52.

An indentation or guide channel 72 is provided in the side faces 34 and 38 of the spiral thread 62 to receive guide pins 74 incorporated in the tapered needles 64. The retainer member 70 also contains a guide channel 76 to engage guide rollers 78 of the tapered needles 64. The foregoing is best shown on FIG. 11.

The tapered needles 64 contact the teeth 54 of the worm gear 22 in accordance with the principle of the present invention, that is, they provide more than two rolling elements to simultaneously come into contact with the load transmitting tooth 54 along the theoratical contact line 57 of a conventionally shaped helicoid worm. Thus, in the second preferred embodiment 60, as in the first preferred embodiment 20, a contact line, rather than a mere two-point contact, is attained between the tooth 54 and the rolling elements of the worm 26. As in apparent from the drawing Figures and from the foregoing description, in the second preferred embodiment 60, no modification of the basic helicoid shape of the spiral thread 62 is necessary.

The tapered needles 64 of the second preferred embodiment 60 are circulated through blocks 80 mounted to the respective ends 82 of the spiral thread 62. The blocks 80 interconnect the load carrying and non-load carrying slots 66 and 68 at the ends 82 of the spiral thread 62. The blocks 80 contain guide channels 84 having appropriately inclined surfaces to cause the tapered needles 64 to roll in proper alignment relative to the respective slots 66 and 68. Proper alignment of the tapered needles 64 in the slots 66 and 68 is maintained by the above-described guide channels 72 and 76 which engage the respective guiding members 74 and 78 of the needles 64.

As in the first preferred embodiment 20, in the second preferred embodiment 60 also, the teeth 54 of the worm gear 22 clear the rolling elements contained in the slot 68 on the non-load carrying side 38 of the spiral thread 62.

Figure 12:
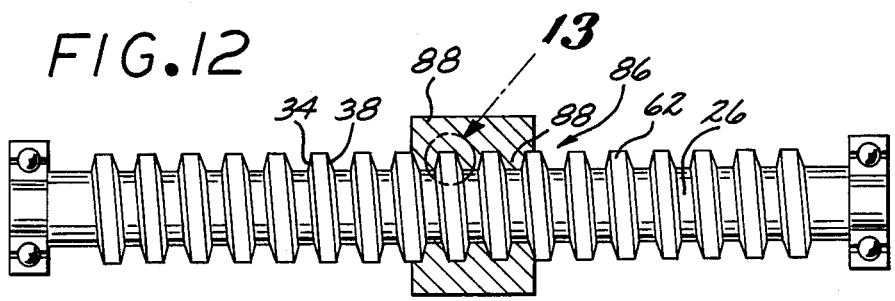
FIG. 12 is schematic front view of a needle screw constructed in accordance with the present invention.
Figure 13:
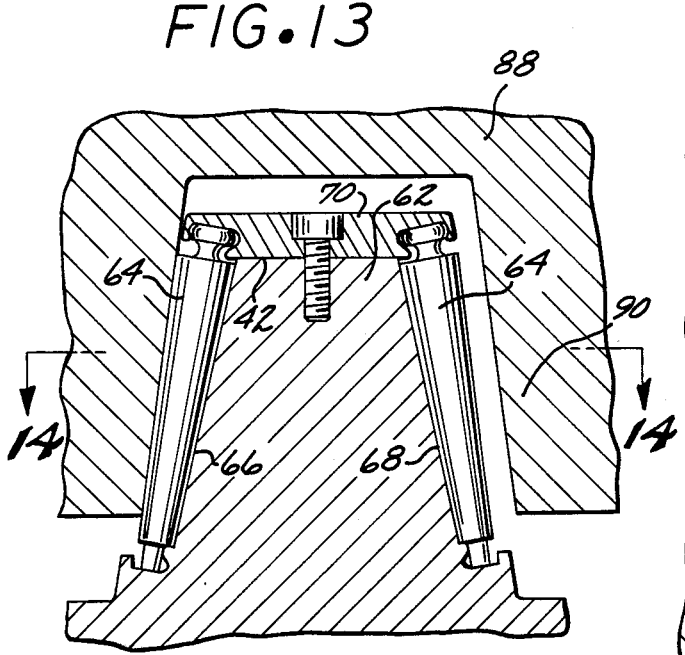
FIG. 13 is an enlarged cross-sectional view of the area indicated by the numeral 13 on FIG. 12.
Figure 14:
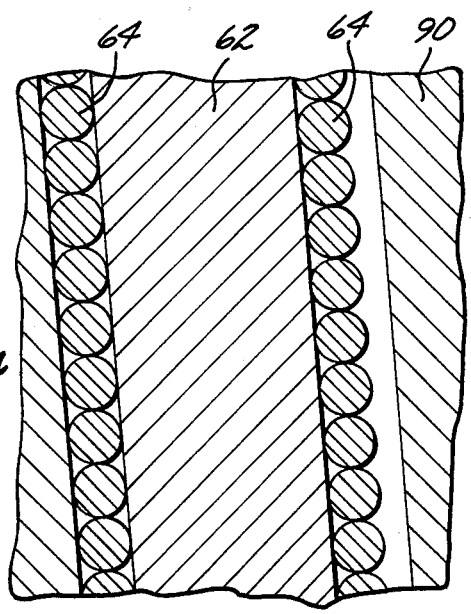
FIG. 14 is a cross-section taken on lines 14, 14 of Figure 13.

Referring now to FIGS. 12, 13 and 14, an application of the above-described worm 26 having tapered needles 64, to an improved "ball screw" is disclosed. This, third preferred embodiment 86 of the present invention comprises an improvement over conventional ball screws (not shown).

As is shown on FIGS. 12-14, the worm 26 has substantially the same construction as the worm 26 of the second preferred embodiment 60. Thus, the worm 26 incorporates tapered needles 64 on both sides 34 and 38 of its spiral thread 62. As in the second preferred embodiment, the tapered needles or rollers 64 are mounted into upwardly open slots 66 and 68, and are held in operative position by a spiral shaped retainer member 70. The retainer member 70 is affixed to the upper face 42 of the spiral thread 62.

A principal difference between the worm - worm gear assembly of the second preferred embodiment 60 and the needle - screw of the third preferred embodiment 86 is that in the third preferred embodiment 86 the worm 26 instead of engaging a worm gear, engages a nut 88 having conventional trapezoid threads 90. The threads 90 of the nut 88 have a continuous rolling contact with the tapered needles 64 on the load carrying side 34 of the spiral thread 62 of the worm 26, and clear the tapered needles 64 on the non-load carrying side 38. This is shown on FIG. 13. It will be readily recognized by those skilled in the art that in this embodiment the load carrying and non-load carryin sides interchange as the direction of movement of the nut 88 on the worm 26 changes.

The needle screw of the third preferred embodiment 86 of the present invention is useful in such applications where prior art ball screws are useful.

It will be readily recognized by those skilled in the art, that the actual dimensions of the spiral threads 30 and 62 and of the rolling elements, balls 40, or tapered needles 64 of the above-described preferred embodiments of the present invention are a matter of detailed engineering design. Such design is best accomplished by computer analysis, and should take into account the precise shape of the worm gear teeth, the desired speed reduction and the magnitude of the torque which is to be transmitted through the worm - worm gear assembly.

Several modifications of the above described invention may become readily apparent to those skilled in the art in light of the foregoing disclosure. Therefore, the scope of the present invention should be interpreted from the following claims, as such claims are read in light of the disclosure.

What is claimed is:

1. A worm gear power transmitting assembly, adapted for operating at relatively flow friction, comprising:
    a rotatably mounted worm having a continuous spiral thread and a longitudinal axis, the spiral thread having an upper face and two side faces;
    a rotatably mounted worm gear having substantially conventional teeth at least one of which is engaged in transmission of load at any given time during operation of the assembly, the worm gear being mounted for operatively engaging the worm, and
    a plurality of rolling elements mounted into the spiral thread of the worm, the spiral thread of the worm having a substantially uniform profile with reference to the longitudinal axis of the worm, and a continuous slot disposed on both of its side faces, the slot comprising means for receiving and circulating a plurality of tapered needles, and wherein the rolling elements comprise a plurality of said tapered needles.

2. The worm gear power transmitting assembly of claim 1 wherein the continuous slot is an upwardly open channel being bounded by at least one straight line taken in the axial cross-section of the worm, and wherein the assembly further comprises a channel closing member configured to be mounted on the upper face of the spiral thread, said closing member closing the channel and comprising means for retaining the tapered needles in the channel.

3. The worm gear power transmitting assembly of claim 2 further comprising at least two members mounted respectively at each end of the spiral teeth of the worm, each of the members comprising means for conducting the tapered needles from a load carrying side of the spiral thread to a non-load carrying side of the spiral thread.

4. The worm gear power transmitting assembly of claim 3 wherein the means for conducting the tapered needles from the load carrying side to the non-load carrying side comprise members mounted to the spiral thread substantially at each end of the spiral thread of the worm, each of the members including a channel in alignment with the slot.

5. A worm gear power transmitting assembly adapted for providing rolling rather than sliding friction between a worm and a meshing worm gear, the assembly comprising:
   a rotatably mounted worm gear;
   a rotatably mounted worm having a continuous spiral thread of substantially uniform profile mounted for operative engagement with the worm gear, the spiral thread of the worm having a load carrying and a non-load carrying side and an upper face and having a substantially continuous slot disposed on both of the load carrying and non-load carrying sides;
   a plurality of tapered needles mounted in the slot, the slot, the tapered needles and the worm gear jointly comprising means for engaging the respective load transmitting tooth of the worm in a substantially continuous contact line while torque is transmitted through the rotating worm and worm gear, and for circulating the tapered needles on the worm for rolling engagement with the worm gear.

6. The worm gear power transmitting assembly of claim 5 further comprising means for allowing the circulating tapered needles to move from the load carrying side of the spiral thread to the non-load carrying side, and vice versa.

7. The worm gear power transmitting assembly of claim 6 wherein in the cross-section taken along the longitudinal axis of the worm, the slot is bounded by a substantially straight line.

8. The worm gear power transmitting assembly of claim 7, wherein the slot is upwardly open, and wherein the assembly further comprises a closing member configured to be mounted on the upper face of the spiral thread, the closing member comprising means for retaining and aligning the tapered needles in the slot.

9. In a power transmitting assembly including a rotatably mounted worm gear, and a worm rotatably mounted for operative engagement with the worm gear, the improvement comprising:
   a substantially helicoid spiral thread having a load carrying and a non-load carrying side and an upper face mounted on the worm having a continuous slot on both of its sides, the slot being bounded, in the cross section taken in the axial direction with reference to the longitudinal axis of the worm, by a substantially straight line;
   a plurality of tapered needles mounted in the slot for rolling motion relative to the slot and for coming into contact with teeth of the worm gear during operation of the assembly, and
   means mounted to the spiral thread for permitting the tapered needles to substantially continuously circulate from the load carrying side of the spiral thread to the non-load carrying side.

10. The improvement of claim 9 wherein the slot is upwardly open, and wherein the improvement further comprises a slot closing member configured to be mounted on the upper face of the spiral thread, the closing member closing the slot and comprising means for retaining the tapered needles in the slot.

11. The improvement of claim 10 wherein each of the tapered needles has a guiding member, and wherein the slot closing member has a guide channel adapted to engage the guiding member, the guiding member and the guide channel jointly comprising means for engaging one another and for maintaining the tapered needles in operative, aligned positions in the slot.

12. The improvement of claim 9 wherein the means mounted to the spiral thread for permitting the tapered needles to substantially continuously circulate from the load carrying side of the spiral thread to the non-load carrying side comprise two members, each of said members being mounted substantially at one end of the spiral thread to engage adjacent load carrying and non-load carrying sides of the spirals, said members comprising channels wherein the tapered needles travel from the load carrying side to the non-load carrying side and vica versa.

13. A screw and nut assembly adapted for providing rolling rather than sliding friction between a screw and a nut mounted on the screw to rotate thereon, the assembly comprising:
   a nut having a substantially conventional trapezoid thread;
   a screw having a substantially helicoid spiral thread having substantially continuous slots disposed on both of its side surfaces;
   a plurality of tapered needles mounted in the slots, the slots, the tapered needles and the screw jointly comprising means for engaging the thread of the nut while torque is transmitted through the rotating screw and nut, and for circulating the tapered needles on the screw for rolling engagement with the thread of the nut.

14. The screw and nut assembly of claim 13 further comprising means for allowing the circulating tapered needles to move from a load carrying side of the spiral thread to a non-load carrying side, and vice versa.

15. The screw and nut assembly of claim 13 wherein in the cross-section taken along the longitudinal axis of the screw, the slot is bounded by a substantially straight line.

16. The screw and nut assembly of claim 13, wherein the slots are upwardly open, and wherein the assembly further comprises a closing member configured to be mounted on the upper face of the spiral thread, the closing member comprising means for retaining and aligning the tapered needles in the slots.

17. In a screw and nut assembly of the type used as a ball screw and including screw having a substantially helicoid spiral thread and a nut having substantially trapezoid threads, the nut being threadedly mounted on the screw, the improvement comprising:
   a plurality of tapered needles mounted in a continuous slot provided in a first side of the spiral thread of the screw and in another continuous slot provided in a second side of the screw, said slots being connected to one another, the tapered needles providing rolling contact between the spiral thread of the screw and the thread of the nut.

18. The improvement of claim 17 wherein the slots are upwardly open, and wherein the improvement further comprises a retainer member mounted on the top surface of the spiral thread of the screw, the retainer member having means for engaging the tapered needles and for maintaining the tapered needles in operative aligned positions in the screw.

* * * * *